(12) United States Patent
Gossweiler, III et al.

(10) Patent No.: US 6,856,313 B2
(45) Date of Patent: Feb. 15, 2005

(54) SYSTEM AND METHOD FOR THE SIMULTANEOUS DISPLAY AND MANIPULATION OF HIERARCHICAL AND NON-HIERARCHICAL DATA

(75) Inventors: Richard Carl Gossweiler, III, Pacifica, CA (US); Jock D. Mackinlay, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 261 days.

(21) Appl. No.: 10/150,016

(22) Filed: May 20, 2002

(65) Prior Publication Data

US 2003/0214517 A1 Nov. 20, 2003

(51) Int. Cl.⁷ ............................................... G06T 15/00

(52) U.S. Cl. ....................................................... 345/419

(58) Field of Search ................................ 345/419, 418, 345/633, 706, 758, 415, 848, 776, 421; 707/10

(56) References Cited

U.S. PATENT DOCUMENTS

| | | | | |
|---|---|---|---|---|
| 5,295,243 A | | 3/1994 | Robertson | 345/848 |
| 5,940,830 A | * | 8/1999 | Ochitani | 707/10 |
| 6,259,451 B1 | * | 7/2001 | Tesler | 345/419 |
| 6,297,824 B1 | * | 10/2001 | Hearst et al. | 345/848 |
| 6,346,939 B1 | * | 2/2002 | Isaacs | 345/421 |
| 6,483,533 B1 | * | 11/2002 | Hall et al. | 348/40 |
| 6,486,895 B1 | * | 11/2002 | Robertson et al. | 345/776 |
| 2001/0049695 A1 | * | 12/2001 | Chi et al. | 707/201 |

* cited by examiner

*Primary Examiner*—Don Wong
*Assistant Examiner*—Huedung X. Cao
(74) *Attorney, Agent, or Firm*—Finnegan, Henderson, Farabow, Garrett & Dunner L.L.P.

(57) ABSTRACT

A system and method for the analysis of hierarchical and non-hierarchical relationships between a set of related nodes and for the creation of a cone graph structure based on the hierarchical and non-hierarchical relationships. The cone graph structure is a three-dimensional or pseudo-three-dimensional object which can be altered and manipulated by the actions of a user. The cone graph structure is an interface for providing a user with a structural understanding of the relationships between different nodes such as files in a file structure of web pages within a web site.

13 Claims, 7 Drawing Sheets

SYSTEM AND METHOD FOR THE SIMULTANEOUS DISPLAY AND MANIPULATION OF HIERARCHICAL AND NON-HIERARCHICAL DATA

BACKGROUND OF THE INVENTION

A. Field of the Invention

The present invention relates to a system and method for the simultaneous display and manipulation of hierarchical and non-hierarchical data.

B. Description of the Prior Art

Traditional displays of linked objects are provided using tree-controlled layouts. These tree-controlled layouts, such as those provided in a list of files stored on a hard drive, include hierarchical information relating lower level hierarchical objects, such as files or programs, to higher level hierarchical objects, such as file folders or drive locations. An exemplary hierarchical structure could be a:\program files\program, wherein the hierarchy is as follows, on the "a" drive a folder entitled "program files" is stored, within which a program called "program" is stored. In this structure the "a" drive would be a higher level node linked to a lower level file folder node linked to a lower level file node.

For some computer storage structures both hierarchical and non-hierarchical links are provided between objects in the storage structures. Examples of computer storage structures including both hierarchical and non-hierarchical links are some computer file systems with links between files, hypertext systems, and the World Wide web. The use of non-hierarchical links is exemplified by web sites on the World Wide web, wherein hyperlinks may be provided within a current hypertext page of a Web site to create a link between the current hypertext page and a hypertext page that is not directly linked to the current document in the hierarchical structure of the Web site. These non-hierarchical links are not properly displayed in the traditional tree-control layout structures.

In a paper by Fairchild, K. M., Poltrock, S. E., and Furnas, G. W., entitled "SemNet: Three-Dimensional Graphic Representations of Large Knowledge Bases," in Guindon, R., Ed., Cognitive Science and its Application for Human Computer Interaction, Lawrence Erlbaum, Hillsdale, N.J., 1988, pp. 201–33, SemNet, a three-dimensional graphical interface is described. SemNet presents views that allow users to examine local detail while maintaining a global representation of the rest of the knowledge base. SemNet also provides semantic navigation techniques such as relative movement, absolute movement, and teleportation.

U.S. Pat. No. 5,295,243 to Robertson et al., which is hereby expressly incorporated herein by reference, discloses a processor for presenting a sequence of images of a hierarchical structure that is perceived as a virtual three-dimensional structure. The hierarchical structure includes conic substructures that can have vertical or horizontal axes. Each conic substructures is presented having a parent node corresponding to its vertex and child nodes at the base of the conic substructure. The conic substructures may be rotated or rearranged by the user.

SUMMARY OF THE INVENTION

The object of the invention is to provide a system and method for displaying hierarchical and non-hierarchical data structures.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a computer implemented method of graphically displaying relationships between a plurality of nodes, comprising: identifying at least one hierarchical relationship between at least two of said plurality of nodes; and generating a virtual three dimensional cone having: graphical representations of each node on a surface of the cone; and graphical representations of the at least one hierarchical relationship.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

The following are definitions that apply to the present invention.

A "processor" is a component or system that can provide processing functions. An example of a processor is a central processing unit (CPU) of a general purpose computer.

A "user input device" is a computer component providing data input functionality to a user. Examples of user input devices include keyboards, mice, track balls, touch pads, and pointing devices.

A "structure" is a single object or feature that may be displayed to a user on a display device. The displayed structure may be comprised of sub-features or sub-structures.

A "node-link structure" is a structure that includes display features that can be distinguished into "nodes" that are localized and "links" that extend between nodes so as to provide connections between pairs of nodes. Nodes may generally be displayed as point or small object structures on the display device and links may be displayed as lines or arcs connecting nodes. The nodes may represent, for example, objects in a tree data structure or other directed graph data structure. The node structures may be "selectable structures," such that operations on the part of a user may be used to "activate" or select the object operated upon. An exemplary operation for selecting an node would be clicking on the node with a mouse button.

A "hierarchical structure" is a structure that is perceptible as having a number of structural levels. A hierarchical node link structure, for example, could have a number of levels of nodes, with links connecting each node on a lower level to a node on a higher level.

A "conic structure" is a displayed structure that is perceptible as having a virtual three-dimensional conic shape with a circular or polygonal directrix. The directrix may be displayed as the base of the virtual three-dimensional conic shape.

Figure 1:
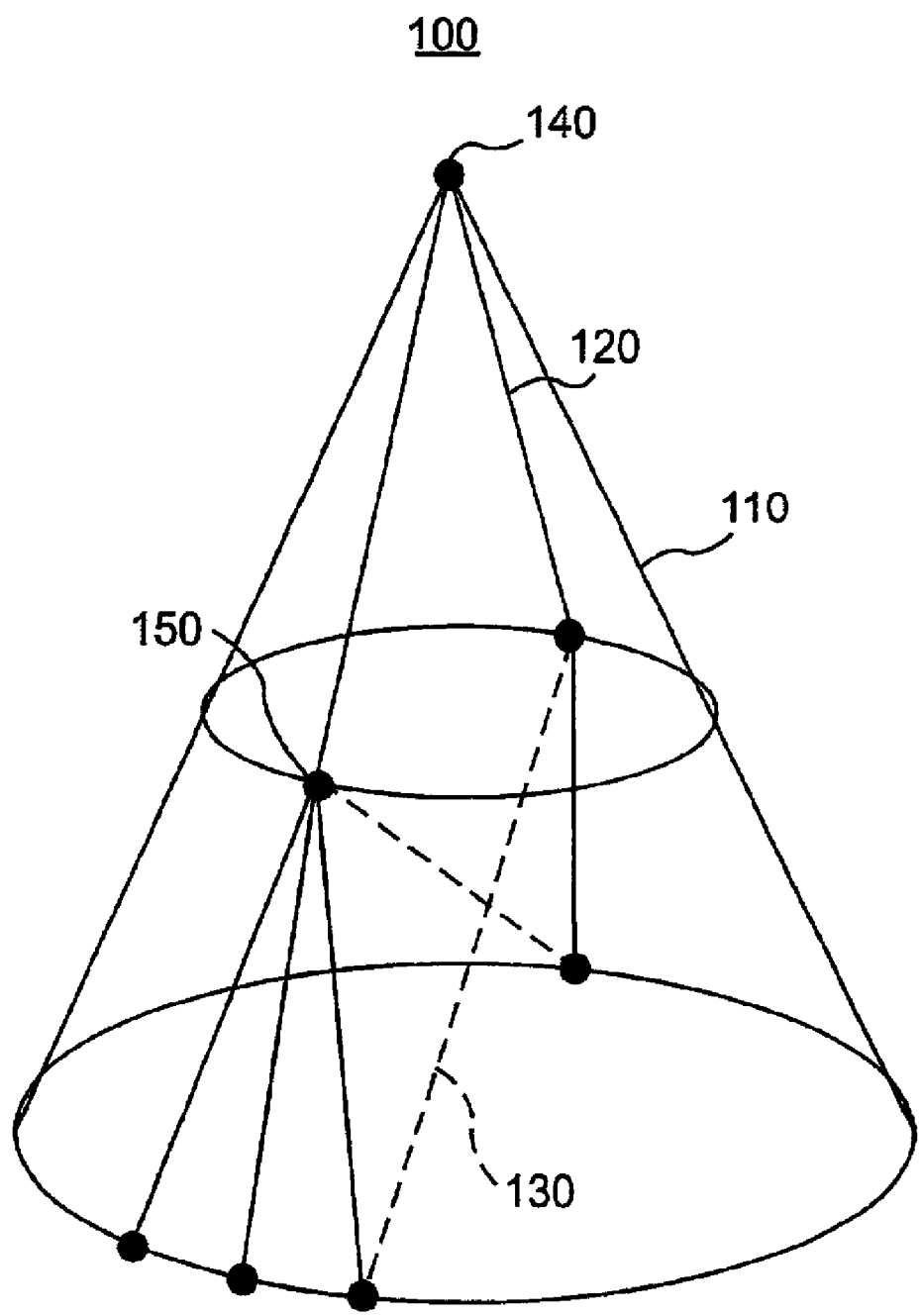
FIG. 1 is a graphical representation of a first exemplary embodiment of a cone graph.

An exemplary cone graph structure 100 is shown in FIG. 1. Cone graph structure 100 includes cone surface 110, hierarchical paths 120 (shown as solid lines on surface 110 of cone 100), non-hierarchical paths 130 (shown as dashed lines extending through the inside of cone 100), vertex node 140, and child nodes 150. Nodes in cone 100 are organized by generation. In other words, each generation of nodes is identified by a co-planar ring 155, and is separated from every other generation by one or more hierarchical 120 and non-hierarchical paths 130. As the generation of nodes progresses down from the vertex node 140, the radius of each ring 155 expands sufficiently to allow the rings of the same generation to lie in a co-planar orientation and for hierarchical paths 120 to lie in a co-planar orientation with the surface of cone 100. Hierarchical and non-hierarchical paths may be two-way or one way. That is, node 140 may connect to node 150, but node 150 may not connect back to node 140. These relationships may be depicted on a three-dimensional cone graph using different thickness lines or different colored lines.

Figure 2:
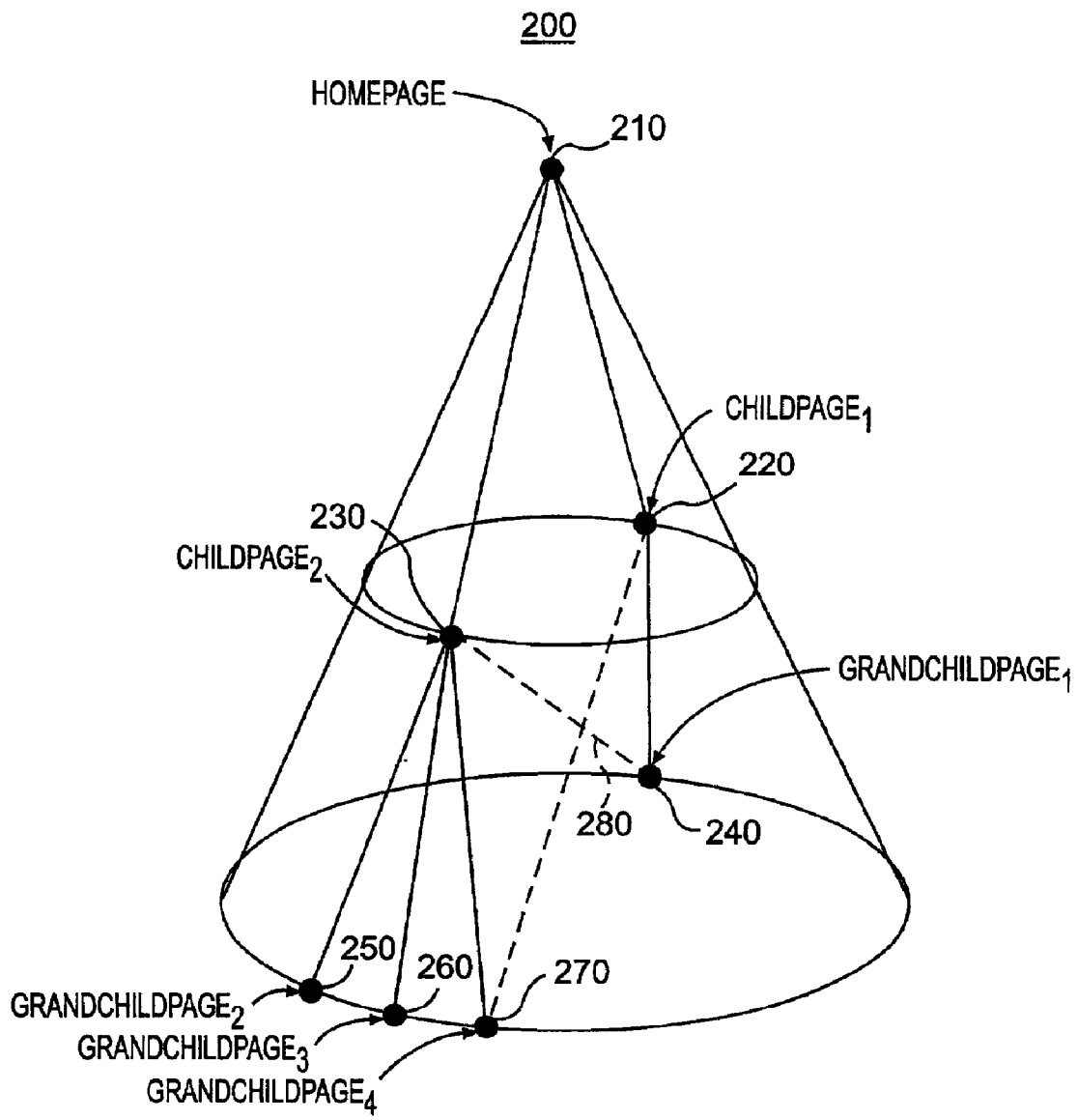
FIG. 2 is a graphical representation of a second exemplary embodiment of the cone graph.

A second exemplary cone graph structure 200 for a Web page is shown in FIG. 2. The nodes of cone graph structure 200 are each identified by a name. The exemplary names of the nodes of the web page include HOMEPAGE 210, CHILDPAGE$_1$ 220 CHILDPAGE$_2$ 230, GRANDCHILDPAGE$_1$, 240, GRANDCHILDPAGE$_2$ 250, GRANDCHILDPAGE$_3$ 260 and GRANDCHILDPAGE$_4$ 270. Alternatively, the nodes may be displayed as icons or other structures for identifying the presence of a node. The nodes themselves may be selectable attributes of the structure, such that, by clicking or selecting a node on the structure, the substructures depending therefrom may be displayed or hidden. The option gives the user the opportunity to increase or decrease the complexity of the displayed structure at a specified point.

An exemplary cone graph structure 100 may be constructed using data characterizing a structure including both hierarchical paths and non-hierarchical paths between nodes. The paths may be, for example, hypertext links between Web pages (nodes).

Figure 3:
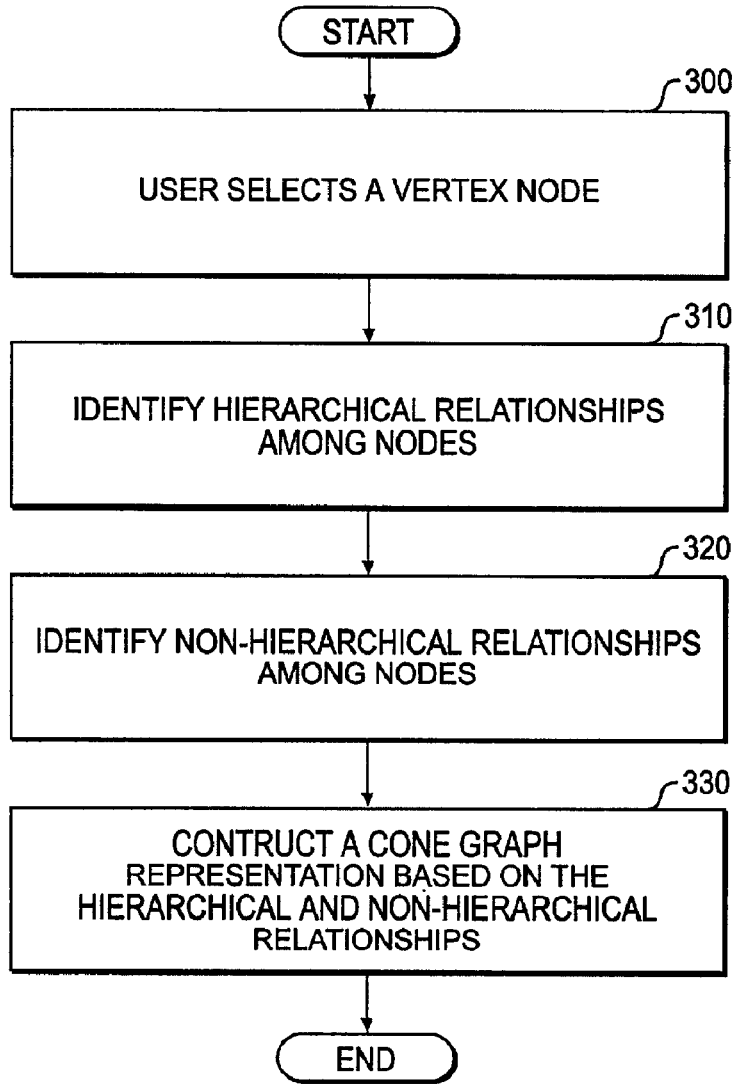
FIG. 3 is a flow chart of an exemplary method of preparing a cone graph.

FIG. 3 provides an exemplary flowchart for the operation of creating a cone-graph structure. An exemplary system for carrying out the operations of the method of FIG. 3 includes a general purpose computer having a central processing unit (CPU), monitor, keyboard, and mouse. For the purposes of the flowchart, the cone graph is used to model data of a Web site, wherein the primary (vertex) node of the cone-graph is selected as a home page of the Web site.

Figure 4:
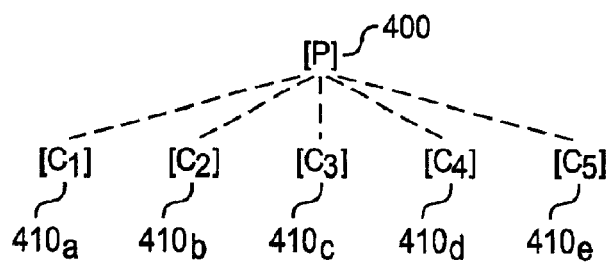
FIG. 4 is a representative parent node with a plurality of associated children 410 nodes.

The first step in the process is to select a node as a vertex node of the cone-graph (300). As discussed above, an exemplary vertex node is a home page of a Web site. Place this node at the apex of the cone and call it the "parent node." The second step is to identify all of the nodes on the cone graph 300 that have a hierarchical (parent-child) relationship with the parent node. Next, create an unbounded list structure or ring comprised of all the child nodes related to the parent node. Child nodes may be sequentially placed on a ring, randomly placed on a ring, or placed on a ring such that nodes with non-hierarchical relationships are maximally distant from each other to simplify the task of drawing non-hierarchical paths 130. Referring to FIG. 4 there is shown a representative parent node 400 with a plurality of associated children 410. The leftmost or rightmost child may include a pointer back to the parent, with each interior child pointing to the child immediately to its left or right, respectively. Each child node 410 may alternatively include a pointer back to the parent 400. The pages can be identified as follows: all pages having hypertext links off of the home page and having Universal Resource Locators (URLs) incorporating the home page as the next higher link are identified as child nodes of the parent node. For example, a hypertext link based on the web page used to construct the cone structure 200 of FIG. 2 would be http://www.HOMEPAGE/ CHILDPAGE$_1$.com. This hyperlink identifies CHILDPAGE$_1$ as a next lower link in a hierarchical structure from HOMEPAGE. This determination is performed for every page in the Web site in order to identify all of the child-parent relationships for the parent node.

Once all the children of the parent node have been identified and the unbounded list created, processing shifts down one level to the child nodes. For each child node, identify all of the grandchild nodes on the cone graph 300 that have a child-parent relationship with the child node. Referring again to FIG. 2, it is shown that URLs identifying GRANDCHILDPAGE$_2$, GRANDCHILDPAGE$_3$ and GRANDCHILDPAGE$_4$ have child-parent relationships with CHILDPAGE$_2$. Once the grandchild nodes for each child node have been identified, create an unbounded list structure or ring comprised of the grandchild nodes. Next, repeat this process for all the grandchild nodes identified.

This process of identifying all the child nodes associated with a parent node and creating an unbounded list structure or ring comprised of the child nodes continues down the cone graph for all the generations in the graph. Identification of the hierarchical (parent-child) relationships may be developed breadth-first as described above, or they may be developed depth-first (go completely down the hierarchy for a child, back up to next child and then back down the hierarchy), without departing from the spirit and scope of this invention.

Once the hierarchical relationships have been identified, processing flows to step 320 (FIG. 3) where the non-hierarchical relationships are identified. Non-hierarchical paths 130 as previously shown, are paths between child nodes and parent nodes that do not have a hierarchical relationship. In the context of web pages, the non-hierarchical paths are hypertext links between the pages of the Web site, wherein the URL of neither of the links identifies the other as the next higher page in the hierarchical structure. For example, based on the structure shown in FIG. 2, a URL identifying GRANDCHILDPAGE$_1$ is not hierarchically linked to CHILDPAGE$_2$, however a non-hierarchical link 280 is shown connecting these two pages.

After all of the hierarchical and non-hierarchical relationships have been identified, processing flows to step 330 where a three-dimensional cone graph representation is constructed based on the hierarchical and non-hierarchical relationships. In one embodiment, a three-dimensional cone graph is rendered by assigning polygons for each node and lines for the edges. The polygons are drawn at various positions in the X, Y and Z coordinate plane. If the Z-axis corresponds to the longitudinal axis of the cone graph, then Z remains constant for each generation. X and Y vary based on the sine and cosine of each point along each ring 155.

Figure 5:
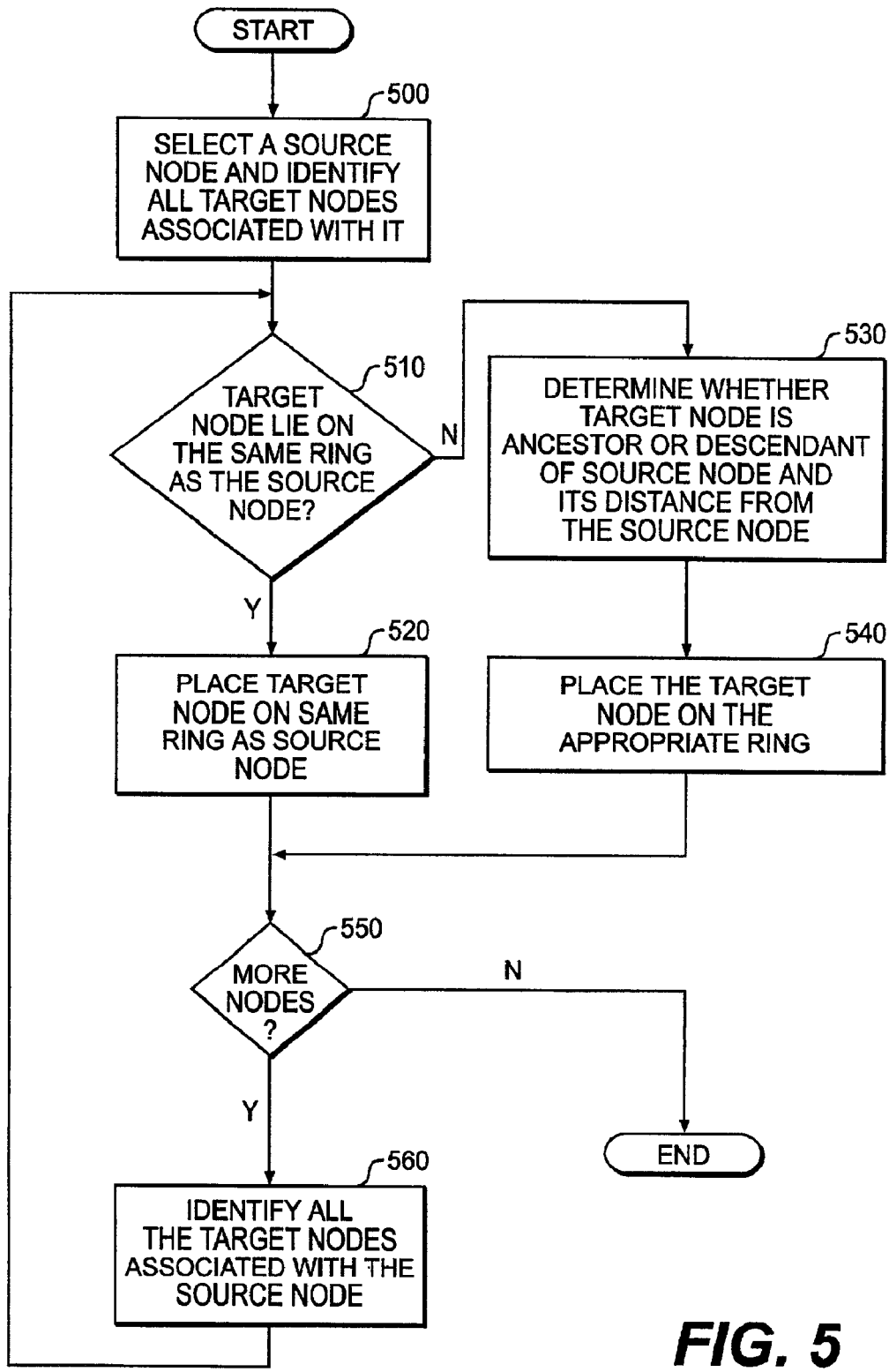
FIG. 5 is a flow chart of an alternate method of preparing a cone graph.

Referring now to FIG. 5, there is shown another process for constructing a three-dimensional cone graph. As shown in FIG. 5, a three-dimensional cone graph may be rendered by visiting a first node called the source node (step 500) and identifying the nodes connected to it (target nodes). For each target node identified in step 500, determine whether the target node lies on the same ring or on another ring (step 510). If the target lies on the same ring, then it is a sibling of the source node and should be placed on the same ring (step 520). If the target node lies on a different ring, determine whether it is an ancestor (above the source node) or a descendant (below the source node) of the source node (step 530). Processing next flows to step 540 where the target node is placed on the appropriate ring of the cone graph away from the source node, based on the number of generations the target node is above or below the source node. The next step is to select another source node that has not yet been visited (step 550) and all the target nodes associated with the new source node (step 560). Processing then flows to step 510. This process is repeated for all the nodes in the cone graph.

Once a cone graph structure has been created, it may be viewed and manipulated as a computer generated three-dimensional (or pseudo three dimensional) object. These manipulations include rotations, zoom changes, slicing the structure (to remove layers of the structure from view in order to, for example, focus on a specific segment of the structure), and skinning the structure (removing the surface of the structure including the hierarchical links thereon to view more clearly the non-hierarchical links within the structure.

Figure 6:
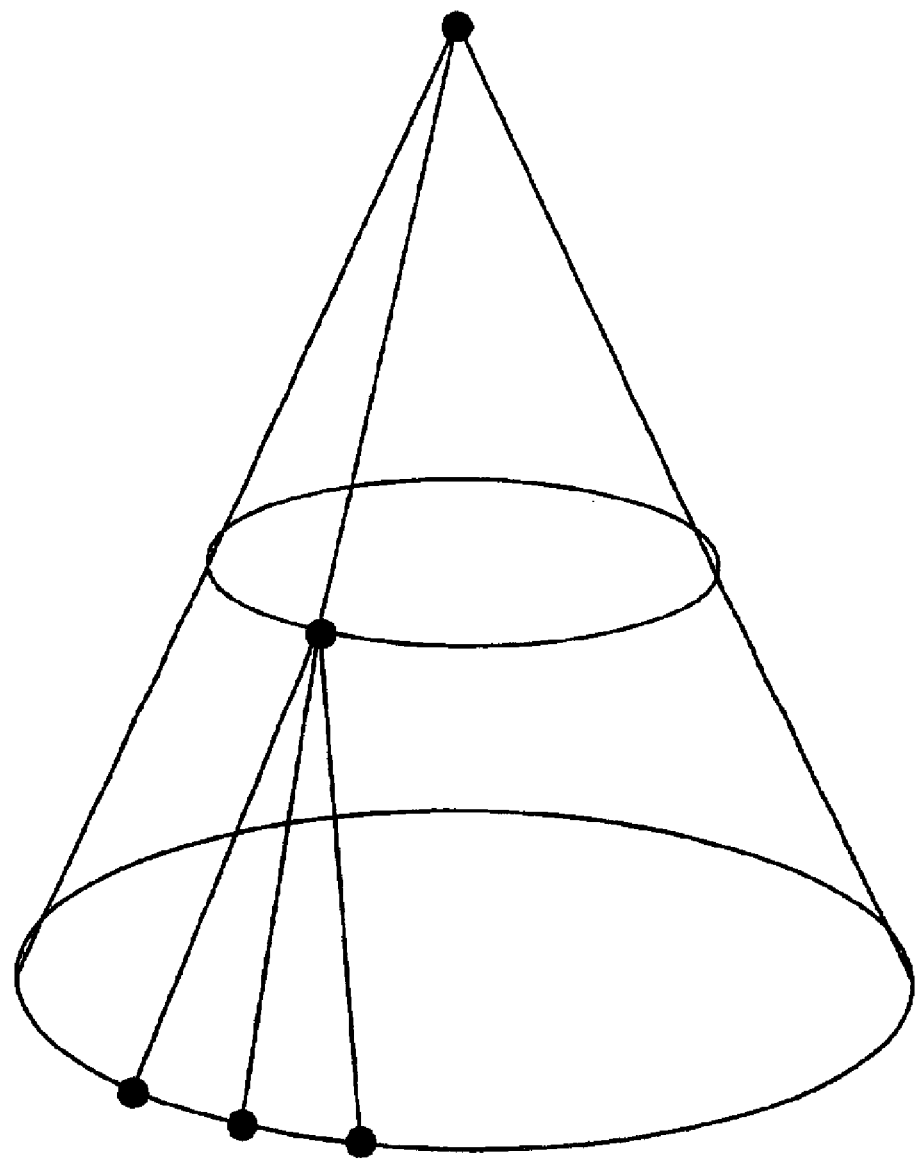
FIG. 6 graphical representation of the exemplary cone graph having an opaque outer surface.

A variety of different display properties may be selected for cone graph structures in order to emphasize or differently display particular information provided in the data used to form the cone structure. These options include making the surface of the cone graph opaque as shown in FIG. 6, such that only the hierarchical information on the side of the cone facing the user is visible. Alternatively the hierarchical or non-hierarchical links may be removed to provide a more detailed view of the remaining information. Another option is to show the surface as translucent, such that both hierarchical and non-hierarchical links may be differently displayed together.

The user may also be given the option to change ring height and ring width. These values may also be linked to the properties of the base data used to create the cone graph, such as file size. Alternatively the sizes of ring height and ring width may be selected to reflect the number of children nodes present on the level to be displayed.

Figure 7:
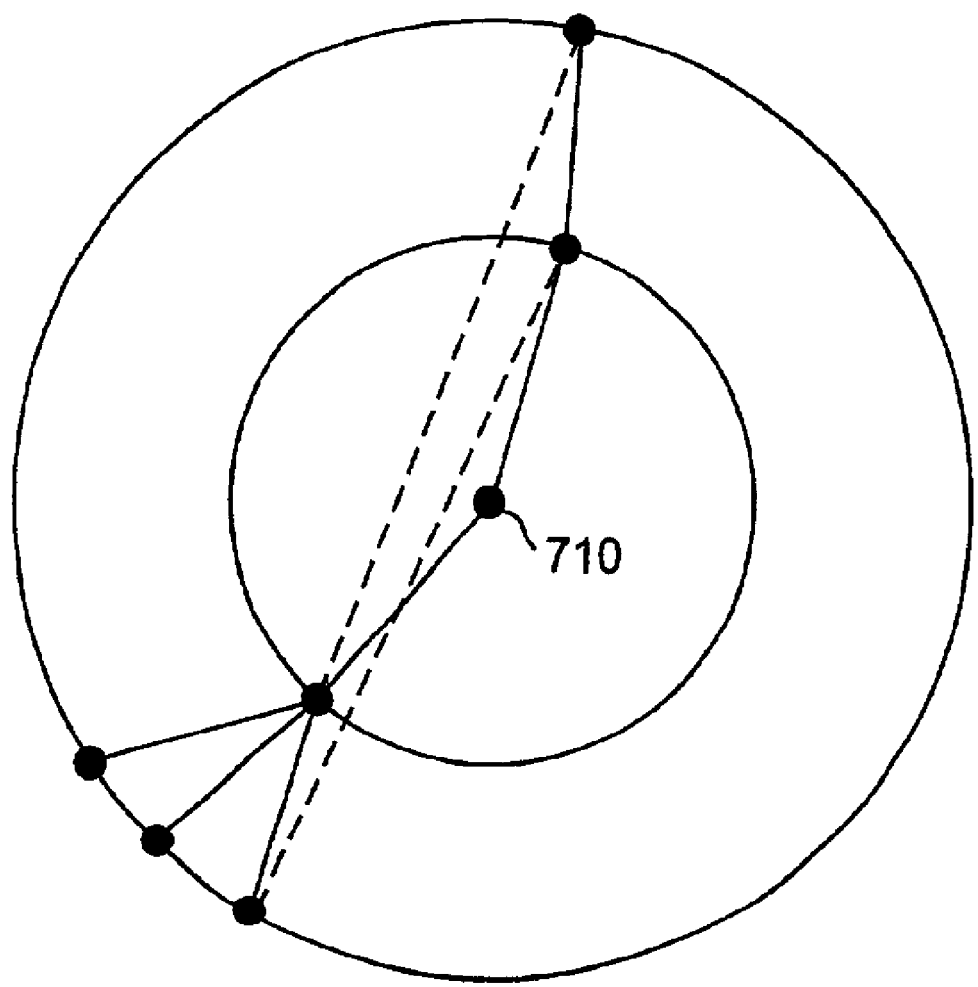
FIG. 7 is a graphical representation of the exemplary cone graph viewed from above.
Figure 8:
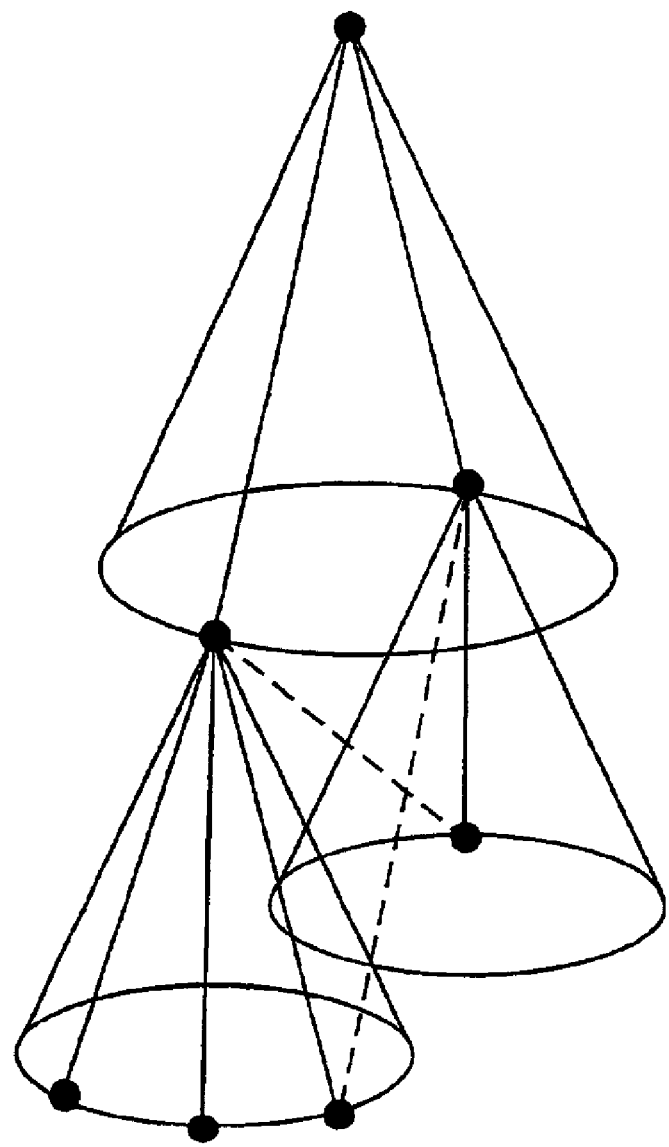
FIG. 8 is a graphical representation of the exemplary cone graph displayed as a tree structure.

In an alternative arrangement, the cone structure 700 may be viewed from above as shown in FIG. 7, which displays the data as concentric circles, wherein the root of the node structure 710 (the vertex node) is provided at the center of the concentric rings and the children on rings extending from the center. The arrangement may also be altered to provide the cone graph structure as a cone tree structure, as shown in FIG. 8.

It will be apparent to those skilled in the art that various modifications and variations can be made in the cone graph representation method of the present invention and in construction of this cone graph representation system without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer implemented method of graphically displaying relationships between a plurality of nodes, comprising:
    identifying at least one hierarchical relationship between at least two of said plurality of nodes; and
    generating a virtual three dimensional cone having:
        graphical representations of each node on a surface of the cone;
        graphical representations of the at least one hierarchical relationship;
    identifying at least one non-hierarchical relationship between at least two of said plurality of nodes; and
    generating graphical representations of the at least one non-hierarchical relationship;
wherein the graphical representations of the non-hierarchical relationships between the pairs of non-hierarchically linked nodes are lines extending through the interior of the cone.

2. The method of claim 1, wherein the hierarchical and non-hierarchical links are hypertext links between nodes.

3. The method of claim 1, wherein the nodes are web pages.

4. The method of claim 1, wherein the graphical representations of the hierarchical relationships between the pairs of hierarchically linked nodes are also lines on the surface of the cone.

5. The method of claim 1, wherein nodes being part of the same level in the node set are represented by a ring around the cone.

6. The method of claim 1, wherein a vertex of the cone is a home page of a web site.

7. The method of claim 1, wherein at least one graphical representation comprises a parent node with a plurality of associated child nodes.

8. The method of claim 7, wherein:
    a first child node includes a pointer to the parent node; and
    a second child node includes a pointer to the first child node.

9. The method of claim 8, wherein a third child node includes a pointer to the second child node.

10. The method of claim 7, wherein the plurality of associated child nodes each include a pointer to the parent node.

11. The method of claim 1, wherein the step of identifying at least one hierarchical relationship between at least two of said plurality of nodes further includes:
    identifying a hierarchical relationship between a vertex node and a child of the vertex node; and
    identifying at least one hierarchical relationship between the child node and all descendants of the child node.

12. The method of claim 11, further comprising the step of identifying at least one hierarchical relationship between the grandchild node and at least one descendant of the grandchild node.

a first child node includes a pointer to the parent node; and at least a second child node includes a pointer to the parent node.

13. The method of claim 1, wherein the step of identifying at least one hierarchical relationship between at least two of said plurality of nodes further includes:

identifying a plurality of hierarchical relationships between a vertex node and a plurality of children of the vertex node; and identifying a plurality of hierarchical relationships between the plurality of children nodes and all descendants of the plurality of children.

* * * * *